UNITED STATES PATENT OFFICE.

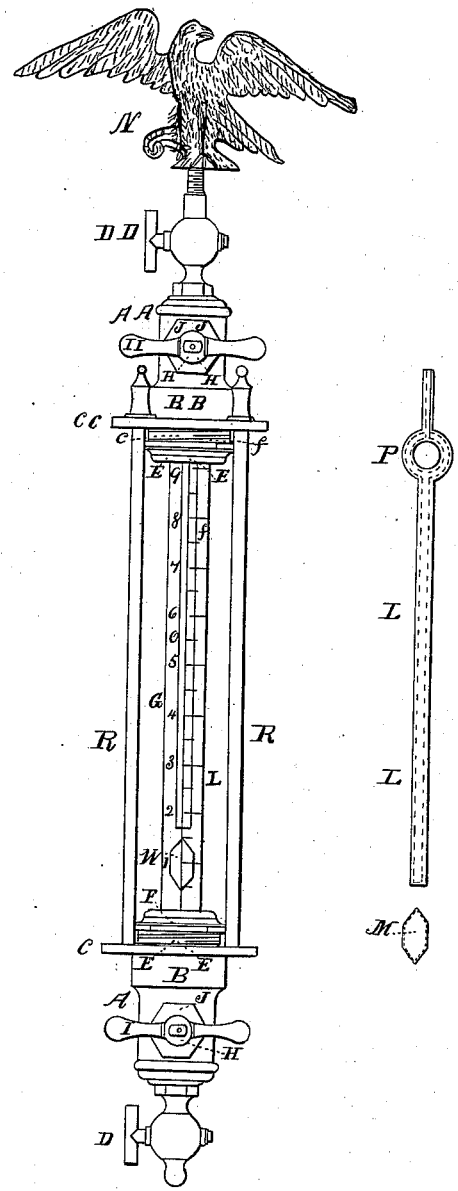

WILLIAM HARTLEY MILLER, OF PHILADELPHIA, PENNSYLVANIA.

LOW-WATER ALARM FOR STEAM-BOILERS.

Specification forming part of Letters Patent No. 32,305, dated May 14, 1861.

*To all whom it may concern:*

Be it known that I, WILLIAM HARTLEY MILLER, of the city and county of Philadelphia, and State of Pennsylvania, have invented a new and useful Improvement in Water-Gages for Steam-Boilers, and for no other purpose; and I do hereby declare that the following is a full and exact description thereof, reference being had to the accompanying drawings, and to the letters of reference marked thereon.

The nature of my invention consists in the peculiar arrangement of attaching a low-water alarm to a water-gage and the float and valve combined.

To enable those skilled in the art to make and use my invention, I will describe its construction and mode of operation as a combined water-gage and whistle-alarm.

A is a metal tube, one inch in diameter and about five inches long, standing out from the boiler about four inches and entering the boiler about one inch. The hole in the outer end of the tube is about one inch long and one-half inch in diameter, opening into the tube or section B, which intersects the tube A at right angles. The hole through the inner end of the tube A, from its intersection of the tube B, is about three inches long and one-eighth of an inch in diameter.

B is a a tube one inch and three-eighths in diameter, measuring from its lower end one-half inch to the intersection of the tube A, thence one inch, when it enlarges two inches in diameter, thence one inch to the flange C, three inches in diameter and one-fourth of an inch thick. The hole in the lower end of the tube B is one inch in diameter, with screw-thread to receive the escape-cock D. The hole in the upper end of the tube B is one and one-half inch in diameter and one inch deep, with screw-thread to receive the hollow nut E, which forms the stuffing-box E F around the glass tube G.

H is a spindle, about four inches long and one-half inch in diameter, which screws into the outer end of the tube A, its end fitting into a cone-shaped valve-seat at the outer terminus of the one-eighth-inch hole through the inner end of the tube A.

I is a handle fitted to the outer end of this spindle, and is about three inches long and three-eighths of an inch in diameter, with a hole through the center receiving end of spindle with nut on to secure it.

J is a hollow nut that slips over the spindle H and screws onto the outer end of the tube A, forming a stuffing-box.

D is an escape-cock about two inches long, varying from one-fourth to one inch in diameter, of the ordinary construction.

About one foot from the flange C, tubes A and B, cock D, nut E, stuffing-box E F, spindle H, handle I, and hollow nut J is another flange C C, tubes A A B B, cock D D, nut E E, stuffing-box *e f*, spindle H H, handle II, and hollow nut J J, similar in every particular to those described and connected with them by the glass tube G and the metal tubes K K.

G is a glass tube, about fourteen inches long and three-fourths of an inch in diameter, connecting the flanges C and C C through the hollow nuts or stuffing-boxes E F *e f*.

K K are metal tubes, about thirteen inches long and three-eighths of an inch in diameter, connecting flanges C and C C through holes near their outer edges, thus serving as protectors of the glass tube G.

The tube A A is screwed into the vertical plate or head of the boiler at right angles with its surface and about five inches above high-water mark, the flange downward facing the flange C on tubes A and B, the tube A being attached in a similar manner about on a level with the fire-line.

L L is a metal tube inside the glass tube G, connecting with the combined valve-float M, which fits in a conical "seat" at its lower end, and the whistle-eagle N, made fast by a screw-thread to the upper end of the cock D D, and this tube is about ten inches long and three-eighths of an inch in diameter, its lower end about opposite low-water mark.

O is a scale of inches and parts of an inch with figures running from the lower end of the glass tube upward for indicating the exact quantity or height of water.

M is a valve, conical, and float combined, and is about one-inch long and one-half inch in diameter. It fits into the lower end of the hollow rod or tube L, and is supported by the water until it falls below this point, when it drops upon a rest about one-eighth of an inch below the float, admitting steam through the tube and whistle-eagle N.

N is an eagle-shaped whistle, so arranged with steam-passages back of the breast and out the mouth that it gives a low whistle sufficient to call the attention within thirty yards.

P is a metal ring, about three-fourths of an inch in diameter, having a half-inch hole through its center admitting the spindle H H, and connecting by a steam-passage the two sections of tube L, inside the glass tube G, a little above and at the intersection of tubes A A and B B.

As steam and water are admitted through the tubes A and A A from the boiler to the glass tube G, the water brings the float to its position, where it remains with the cock D D left open, which must be done. When the water falls below the position of the float or low-water mark, the alarm is given. The cock D D may be closed till the boiler is replenished, when it must be left open, as before, all being ready for another alarm the moment the water again falls. Test the reliability at any time without lowering the water in the boiler by opening the cock D till the water falls to low-water mark in the tube, (indicated by numbers on the glass or position of the float.) Readjust the float in this case by turning short the cock D. At the intersection of the tubes A and B may be placed a cock-stop, with two one-eighth-inch holes drilled to the center at right angles with each other. When one hole is turned to the boiler, the other stands to the glass tube G or to the lower end of the tube B. By turning to the right from first position the holes are turned to the glass tube G and to the spindle H, which, with the cock D, is dispensed with. The inner end of tube A A may be supplied with a common cock-stop, thus leaving an open passage for the tube L L through the tube B B.

A metal coil may be used instead of the tubes K K, attached to the flanges C and C C, in the manner and for the purpose specified in description above.

I will now refer to the figures upon the drawings.

Figure 1 is a view of the combined water-gage and whistle-alarm on a level with the eye. Fig. 2, also on a level with the eye, is a view of the combined valve and float, with tube operating the alarm.

I do not claim the whistle-alarm nor water-gage separately; but

What I do claim as my invention, and desire to secure by Letters Patent, is—

The metal tube L and the valve-float M, working within the glass tube G, in the manner and for the purpose specified above, and for no other purpose.

WILLIAM HARTLEY MILLER.

Witnesses:
LEWIS E. WELLS,
SAML. SEARS.